(12) United States Patent
Fukushima et al.

(10) Patent No.: US 7,220,183 B2
(45) Date of Patent: *May 22, 2007

(54) BEARING APPARATUS FOR A WHEEL OF VEHICLE

(75) Inventors: Shigeaki Fukushima, Iwata (JP); Noriaki Ida, Iwata (JP); Kiyoshige Yamauchi, Iwata (JP); Masahiro Ozawa, Iwata (JP)

(73) Assignee: NTN Corporation (JP)

( * ) Notice: Subject to any disclaimer, the term of this patent is extended or adjusted under 35 U.S.C. 154(b) by 18 days.

This patent is subject to a terminal disclaimer.

(21) Appl. No.: 10/658,520

(22) Filed: Sep. 9, 2003

(65) Prior Publication Data

US 2004/0121847 A1 Jun. 24, 2004

(30) Foreign Application Priority Data

Sep. 10, 2002 (JP) .............................. 2002-263969
Aug. 8, 2003 (JP) .............................. 2003-206697

(51) Int. Cl.
*F16D 3/84* (2006.01)

(52) U.S. Cl. ...................................... 464/178; 384/544

(58) Field of Classification Search ................ 464/178, 464/906; 384/544, 589; 301/105.1
See application file for complete search history.

(56) References Cited

U.S. PATENT DOCUMENTS 6,146,022 A * 11/2000 Sahashi et al. ............. 384/544
6,497,515 B1 * 12/2002 Sahashi et al. ............. 384/544
6,773,165 B2 * 8/2004 Ozawa et al. ............... 384/544
6,780,114 B2 * 8/2004 Sahashi et al. ............. 464/906
6,974,259 B2 * 12/2005 Nomura et al. ............. 384/544
2002/0051597 A1 * 5/2002 Sera et al. ................... 384/544

FOREIGN PATENT DOCUMENTS

| JP | 2001-018605 | 1/2001 |
| JP | 2003-089301 | 3/2003 |
| WO | WO 02/18808 A1 * | 3/2002 |

* cited by examiner

*Primary Examiner*—Greg Binda
(74) *Attorney, Agent, or Firm*—Harness, Dickey & Pierce, P.L.C.

(57) ABSTRACT

A bearing apparatus for a driving wheel of a vehicle has a wheel hub (1), a constant velocity universal joint (3) and a double row rolling bearing (2) assembled as a unit. The wheel hub (1) and the outer joint member (14) of the constant velocity universal joint (3) are fitted to each other. At least one of the inner raceway surface (1*a*) of the double row rolling bearing (2) is formed on the wheel hub. A hardened irregular portion (5) is formed on the inner circumferential surface of the wheel hub (1). The wheel hub 1 and the outer joint member (14) are integrally connected via plastic deformation of a fitting portion (17*b*) of the outer joint member. The hardened irregular portion (5) bites into the surface of the fitting (17*b*). A connected portion of the wheel hub and outer joint member has a plastic deformed connection mechanism having an axial pull-out proof force more than 160 kN.

8 Claims, 11 Drawing Sheets

Prior Art

Fig. 14

Prior Art

BEARING APPARATUS FOR A WHEEL OF VEHICLE

CROSS-REFERENCE TO RELATED APPLICATIONS

This application claims priority to Japanese Patent Application Nos. 2002-263969 filed Sep. 10, 2002 and 2003-206697 filed Aug. 8, 2003, which applications are herein expressly incorporated by reference.

FIELD OF THE INVENTION

The present invention relates to a bearing apparatus for supporting a driving wheel of vehicle and, more particularly, to a vehicle wheel bearing apparatus where a wheel hub, a constant velocity universal joint and a double row rolling bearing are assembled as a unit.

BACKGROUND OF THE INVENTION

The driving wheels such as rear wheels of a FR (Front engine/Rear drive) vehicle, front wheels of a FF (Front engine/Front drive) vehicle and all wheels of a 4WD (4-wheel Drive) vehicle are supported by a suspension system via a wheel bearing apparatus. In recent years, there is a tendency to assemble the wheel hub, the constant velocity universal joint and the double row rolling bearing as a unit in order to reduce the weight and the size of the wheel bearing apparatus.

Figure 14:
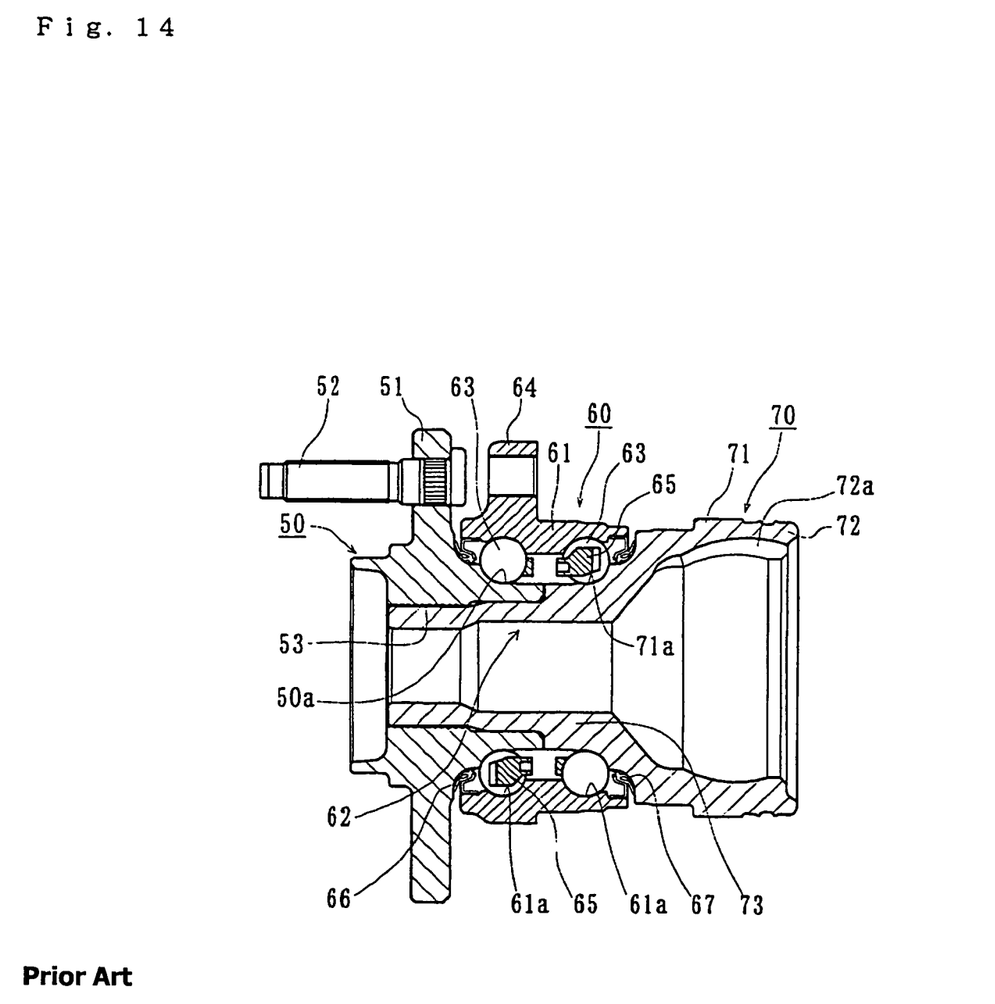
FIG. 14 is a longitudinal section view of another wheel bearing apparatus of the prior art.

FIG. 14 is a longitudinal cross-section view of a prior art vehicle driving wheel bearing apparatus in which a wheel hub 50, a double row rolling bearing 60 and a constant velocity universal joint 70 are assembled as a unit. The wheel hub 50 is formed integrally with a wheel mounting flange 51 to mount a wheel (not shown). Hub bolts 52 to secure the wheel are equidistantly arranged along the periphery of the flange 51.

The double row rolling bearing 60 has an outer member 61, an inner member 62 and double row rolling elements 63 and 63. The outer member 61 has an integrally formed flange 64 to be mounted on a body of a vehicle (not shown) and double row outer raceway surfaces 61a and 61a formed on the inner surface. The inner member 62 has the wheel hub 50 and an outer joint member 71. The inner member 62 is formed with double row inner raceway surfaces 50a and 71a arranged respectively opposite to the outer raceway surfaces 61a and 61a of the outer member 61. The inner raceway surface 50a is formed on the outer circumferential surface of the wheel hub 50. The other raceway surface 71a is formed on the outer circumferential surface of the outer joint member 71 of the constant velocity universal joint 70. The double row rolling elements 63 and 63 are arranged between the outer raceway surfaces 61a and 61a and the inner raceway surfaces 50a and 71a. The rolling elements 63 and 63 are rotatably held by cages 65 and 65. Seals 66 and 67 are arranged at the ends of the double row rolling bearing 60 in order to prevent leakage of grease contained within the bearing and also to prevent ingress of rain water or dusts.

The constant velocity universal joint 70 has the outer joint member 71, a joint inner ring, a cage and torque transmission balls (not shown). The outer joint member 71 has a cup shaped mouth portion 72, a shaft portion 73 axially extending from the mouth portion 72, and axially extending curved track grooves 72a. The track grooves 72a are formed on the inner surface of the mouth portion 72.

The wheel hub 50 is formed with hardened irregular portion 53 on the inner circumferential surface. The wheel hub 50 and the outer joint member 71 are mutually connected by fitting the shaft portion 73 of the outer joint member 71 into the wheel hub 50. The fitting portion of the outer joint member 71 is radially outwardly expanded to cause plastic deformation of the outer joint member 71. This causes the hardened irregular portion 53 to bite into the outer circumferential surface at the fitting portion of the outer joint member 71 (see pages 4 and 5 and FIG. 1 of Japanese Laid-Open Patent Publication No. 18605/2001).

This type of connection structure, via the plastic deformation, can prevent loosening and abrasion of the fitted portion and thus can improve the durability and the driving stability. In addition, since the connection, via the plastic deformation, has both functions of torque transmission and connection of the wheel hub and the outer joint member, it is possible to achieve weight and size reduction of the apparatus.

In this type of wheel bearing apparatus, it is difficult to confirm the state of the connection between the wheel hub 50 and the outer joint member 71 due to the plastic deformation connection. Thus, the confirmation of the strength and endurance of the connected portion is carried out by a breakdown test via sampling inspection. Thus, it is desirable to further improve the quality and reliability of the connected portion.

Figure 13:
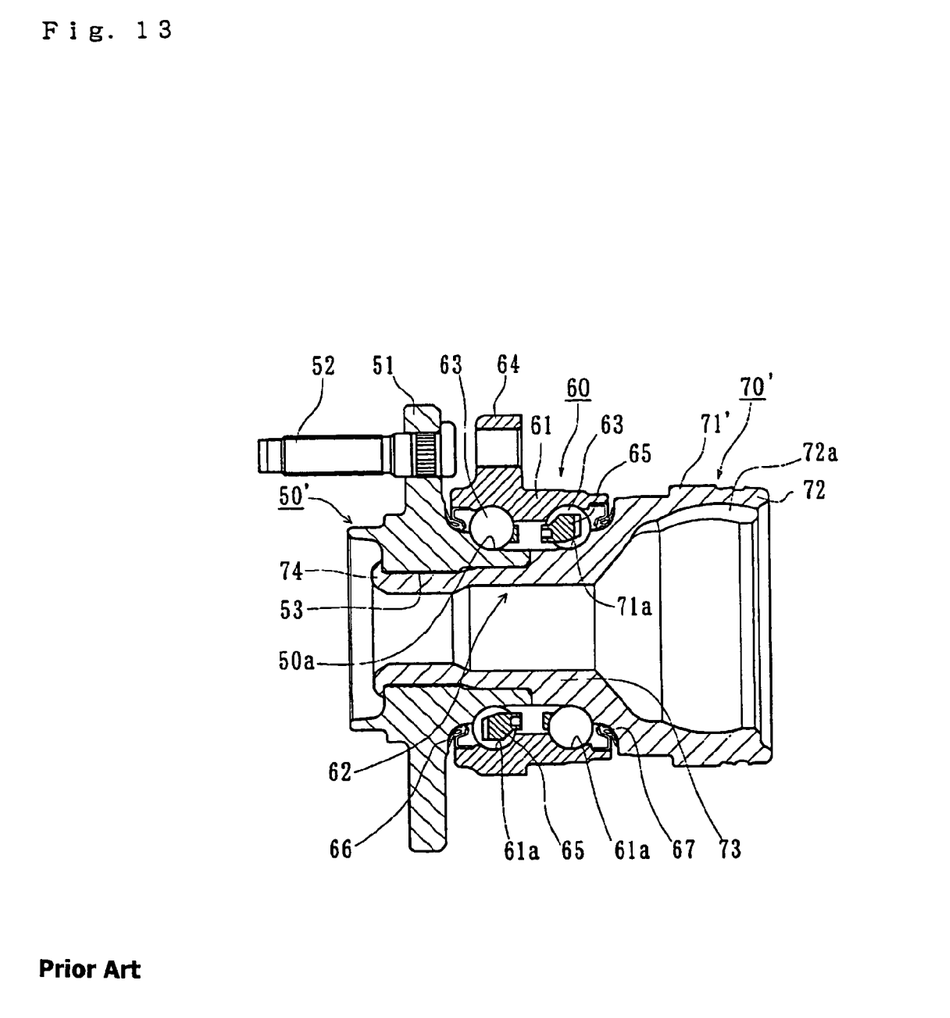
FIG. 13 is a longitudinal section view of a wheel bearing apparatus of the prior art.

For solving this problem, the applicant has proposed a vehicle wheel bearing apparatus shown in FIG. 13. In this bearing apparatus a hardened irregular portion 53 is formed on a radially outwardly arranged member (in this case the wheel hub 50') at the fitted portion of the wheel hub 50' and the outer joint member 71'. The wheel hub 50' and the outer joint member 71' integrally connected via plastic deformation of a radially inwardly arranged member (in this case the outer joint member 71') by radially outwardly expanding the radially inwardly arranged member. This causes the hardened irregular portion of the radially outwardly arranged member to bite into the surface of the radially inwardly arranged member. The members are axially secured, via a caulked portion 74, formed by plastically deforming the end of the radially inwardly arranged member 71' (see pages 3 and 4, FIG. 1 and FIG. 2 of Japanese Laid-Open Patent Publication No. 89301/2003).

However, such a bearing apparatus requires the caulking step or a retaining ring mount step in addition to the connecting step of the wheel hub 50' and the outer joint member 71' via plastic deformation. In recent years, the art has required not only compactness and light weightness of the bearing apparatus but an improvement of quality, reliability as well as low manufacturing cost.

SUMMARY OF THE INVENTION

It is, therefore, an object of the present invention to provide a bearing apparatus for a driving wheel of a vehicle with low manufacturing cost and a solid connected portion even if a heavy moment is applied to prevent pre-press pull-out.

According to the present invention, a vehicle wheel bearing apparatus has a wheel hub, a constant velocity universal joint and a double row rolling bearing assembled as a unit. The wheel hub and outer joint member of a constant velocity universal joint are fitted with each other. A connected portion of the wheel hub and the outer joint member have a plastic deformed connection with an axial pull-out proof force more than 160 kN.

A bearing apparatus for a driving wheel of a vehicle comprises an outer member formed with double row outer raceway surfaces on the inner peripheral surface. Double row inner raceway surfaces are arranged opposite to the double row outer raceway surfaces. An inner ring includes one of double row inner raceway on its outer peripheral surface. The inner ring is formed into a wheel hub integrally formed with a wheel mounting flange or into another inner ring. The outer peripheral surface includes the other double row inner raceway surface. A connected portion has a plastic deformed connection with an axial pull-out proof force more than 160 kN. Accordingly, gap variation of the double row rolling bearing is substantially eliminated even if a predetermined moment load is applied. Thus, durability can be maintained for a long term.

A bearing apparatus for a vehicle driving wheel has the wheel hub, the constant velocity universal joint and the double row rolling bearing assembled as a unit. The wheel hub and the outer joint member of the constant velocity universal joint are fitted to each other. One of the inner raceway surfaces of the double row rolling bearing is formed on the wheel hub and the other of the double row inner raceway surfaces is formed on the outer joint member. A hardened irregular portion is formed on a radially outwardly arranged member at the fitted portion of the wheel hub and the outer joint member. The wheel hub and the outer joint member are integrally connected via plastic deformation of the radially inwardly arranged member. The radially inwardly arranged member is radially outwardly expanded so that the hardened irregular portion of the radially outwardly arranged member bites into the surface of the radially inwardly arranged member. The connected portion, according to this structure, has a sufficient axial pull-out proof force and provides the bearing apparatus with light weight and compact characteristics as well as a low manufacturing cost.

Additionally, the bearing apparatus may have a so-called fourth generation structure where it is possible to reduce the number of parts to prevent a loose connected portion even if repeated stress is applied due to the bending moment of the bearing apparatus during turning of the vehicle. This structure further increases the pulling-out proof force.

The bearing apparatus may be a so-called a third generation structure. Here, it is possible to provide a self-retaining structure providing an initial bearing gap. This lowers the manufacturing cost due to standardization of the bearing parts.

The bearing apparatus may have the portion to be radially outwardly expanded projecting beyond the hardened irregular portion. This structure enables an increase of the pull-out proof force at the connected portion in addition to an increase of the pull-out proof force at the plastically deformed connected portion.

The bearing apparatus provides annular grooves and axial grooves to increase the pull-out proof force at the connected portion.

The bearing apparatus maintains the initial bearing gap and assures a desired endurance for a long term.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

The following description of the preferred embodiment(s) is merely exemplary in nature and is in no way intended to limit the invention, its application, or uses.

Figure 1:
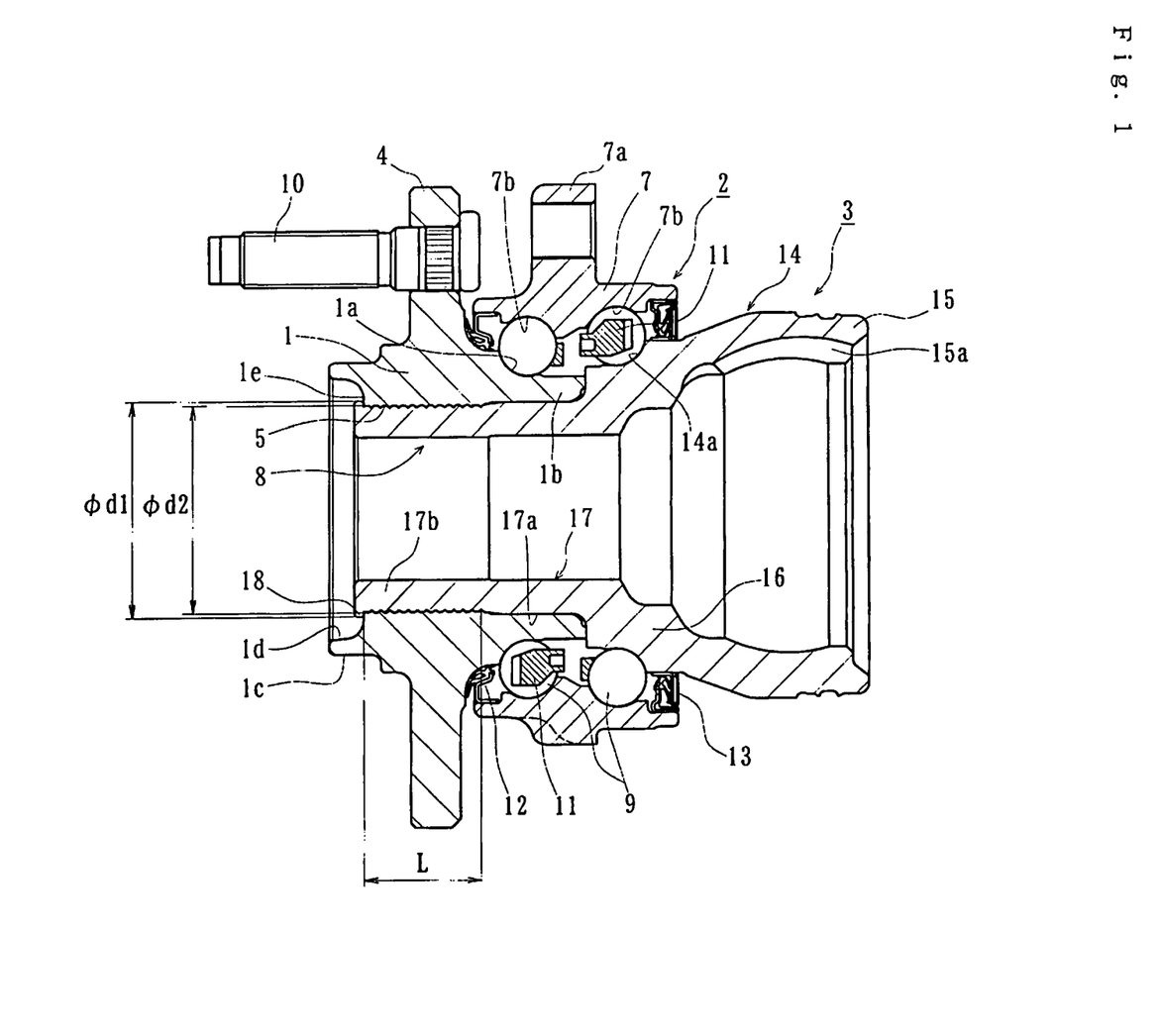
FIG. 1 is a longitudinal section view of a first embodiment of the wheel bearing apparatus of the present invention.

FIG. 1 shows a first embodiment of a bearing apparatus for a driving wheel of a vehicle of the present invention. The apparatus includes a wheel hub 1, a double row rolling bearing 2 and a constant velocity universal joint 3 assembled as a unit. In the description below, the term "outboard side" of the apparatus denotes a side which is positioned outside of the vehicle body and the term "inboard side" of the apparatus denotes a side which is positioned inside of the body when the apparatus is mounted on the vehicle body.

The wheel hub 1 is formed integrally with a wheel mounting flange 4 at the outboard side of the wheel hub 1 on which a wheel (not shown) is mounted. Hub bolts 10 are equidistantly arranged on the flange 4 along its periphery. The inner circumferential surface of the wheel hub 1 is formed with an irregular portion 5. The irregular portion 5 is heat treated to have a hardened layer with a surface hardness of HRC 54~64. It is preferable to use a high frequency induction heating as heat treatment. The high frequency induction heating easily carries out a local heating and a setting of the depth of a hardened layer.

Figure 2:
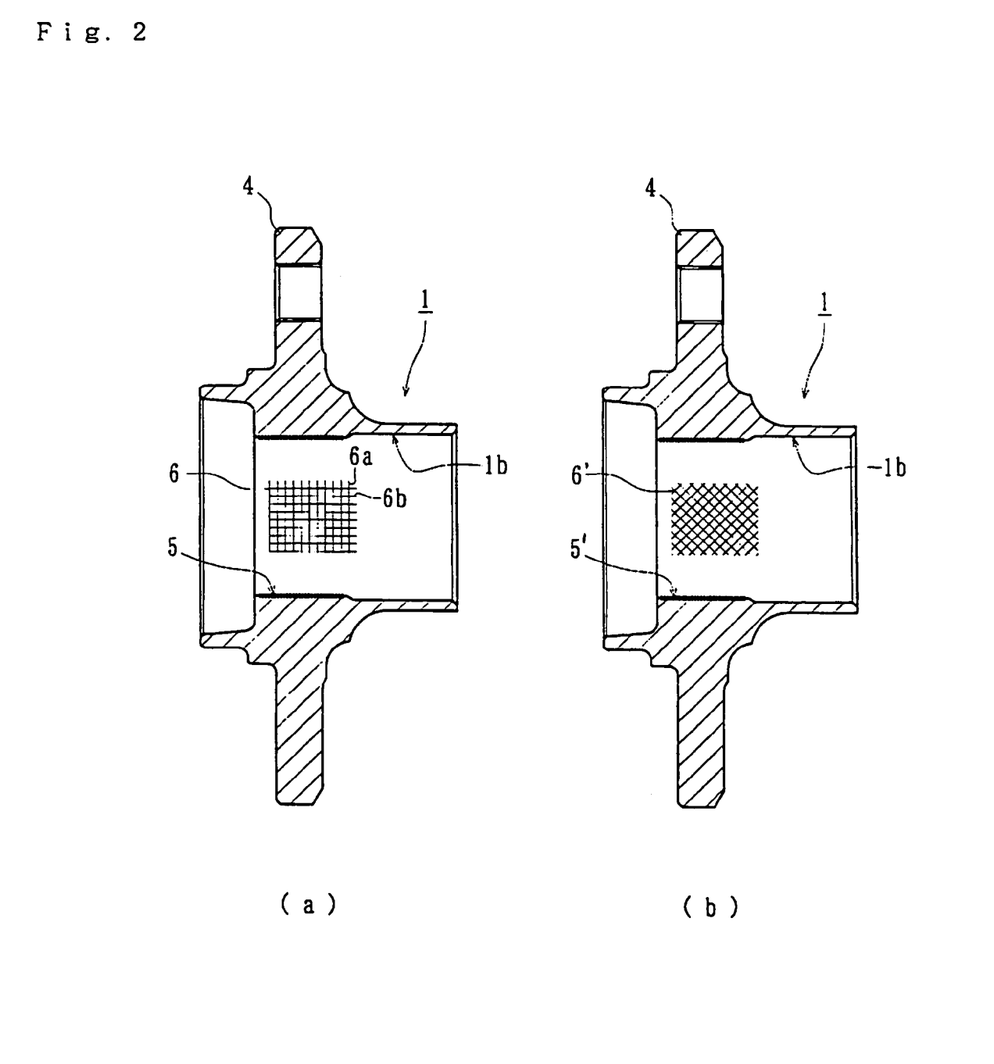
FIG. 2(a) is a longitudinal section view of a wheel hub with a knurled crisscross pattern formed by mutually crossed axial grooves and discontinuous annular grooves.
FIG. 2(b) is a longitudinal section view of a wheel hub with a knurled crisscross pattern formed by mutually inclined helical grooves.

FIG. 2 shows examples of the irregular portion 5. FIG. 2(a) shows an example of the irregular portion 5 as substantially orthogonally crossed grooves 6. The grooves 6 are comprised of a plurality of discontinuous lathe turned annular grooves 6a and a plurality of broached axial grooves 6b. FIG. 2(b) shows an example of the irregular portion 5' comprised of mutually inclined helical grooves 6' in a crisscross pattern. It is preferable to form the irregular portion 5, 5' by pointed projections such as pyramids to assure a good biting performance.

The double row rolling bearing 2 includes an outer member 7, inner member 8 and double row rolling elements 9 and 9. The outer member 7 is integrally formed with a body mounting flange 7a on its outer circumferential surface. Double row outer raceway surfaces 7b and 7b are formed on its inner circumferential surface. The inner member 8 includes the wheel hub 1 and an outer joint member 14. Inner raceway surfaces 1a and 14a oppose the outer raceway surfaces 7b and 7b. The inner raceway surfaces 1a, 14a are arranged on the outer circumferential surfaces of the wheel hub 1 and the outer joint member 14, respectively. The double row rolling elements 9 and 9 are contained between the outer raceway surfaces 7b and 7b and the inner raceway surfaces 1a and 14a. The rolling elements 9 and 9 are freely rotatably held by cages 11 and 11. Seals 12 and 13 are arranged at the ends of the bearing 2 to prevent leakage of grease contained within the bearing 2 as well as ingress of rain water or dusts. A hardened layer is formed for example by induction hardening at regions around the outer circumferential surface of the wheel hub 1. This forms a seal land portion, to which the seal 12 slidably contacts the inner raceway surface 1a, and a surface on spigot portion 1b, which the shoulder 16 of the outer joint member 14 abuts. The illustrated ball rolling elements 9 and 9 may be replaced for example by conical rolling elements.

In such a kind of bearing apparatus, a larger moment is applied to the rolling bearing of the inboard side of the double row rolling bearing than that of the outboard side. According to the preferred embodiment of the present invention, the pitch circle diameter (PCD) of the rolling elements 9 of the inboard side is set somewhat larger than that of the rolling elements 9 of the outboard side. This increases the load supporting capacity of the rolling bearing of the inboard side. It is also possible to increase the load supporting capacity by changing the number or size of the rolling elements 9 of the inboard side.

The constant velocity universal joint 3 includes the outer joint member 14, the joint inner ring (not shown), the cage, and the torque transmitting balls. The outer joint member 14 has a cup-shaped mouth portion 15. A shoulder 16 forms the bottom of the mouth portion 15. A shaft portion 17 axially extends from the shoulder 16. An axially extending curved track groove 15a is formed on the inner surface of the mouth portion.

The inner raceway surface 14a is formed around the outer circumferential surface of the shoulder 16 of the hollow outer joint member 14. The shaft portion 17 has a stepped portion of small diameter 17a onto which the spigot portion 1b of the wheel hub 1 is press fit and a fitting portion 17b onto which the wheel hub 1 is fitted. The fitting portion 17b is fitted into the wheel hub 1 with the end surface of the spigot portion 1b of the wheel hub 1 abutting against the shoulder 16 of the outer joint member 14. The wheel hub 1 and the outer joint member 14 are integrally connected via plastic deformation of the fitting portion 17b of the outer joint member 14. This causes the hardened irregular portion 5 of the wheel hub 1 to bite into the outer circumferential surface at the fitting portion of the outer joint member 14 by radially outwardly expanding the fitting portion of the outer joint member 14. Since the fitted portion, via plastic deformation, has both a torque transmitting function and a joining function of the wheel hub 1 and the outer joint member 14, any provision of a torque transmitting mechanism, such as a conventional serration on the wheel hub 1 and the outer joint member 14, as well as an axially securing mechanism, is not required. Accordingly, it is possible to realize a further reduction of the weight and size of the apparatus.

The outer joint member 14 is formed with a hardened layer at the track groove 15a, formed on the inner surface of the mouth portion 15, and a region from the seal land portion, on which the seal slidably contacts to the stepped portion of small diameter 17a of the shaft portion 17 through the inner raceway surface 14a. It is preferable to carry out the heat treatment by high frequency induction heating. It is also preferable to keep the fitting portion 17b as a non-quenched portion having surface hardness less than HRC 24 and to set the surface hardness of the irregular portion 5 of the wheel hub 1 at about HRC 54~64 to hold a difference in the hardness between the irregular portion 5 and the fitting portion 17b larger than HRC 30. This enable the irregular portion 5 to easily bite into the fitting portion 17b without causing deformation of the irregular portion 5 to tightly combine them via plastic deformation. Although not illustrated, an end cap is usually arranged at an end of the outer joint member 14 in order to prevent leakage of grease contained within the mouth portion 15 and to prohibit ingress of dusts from the outside.

Figure 3:
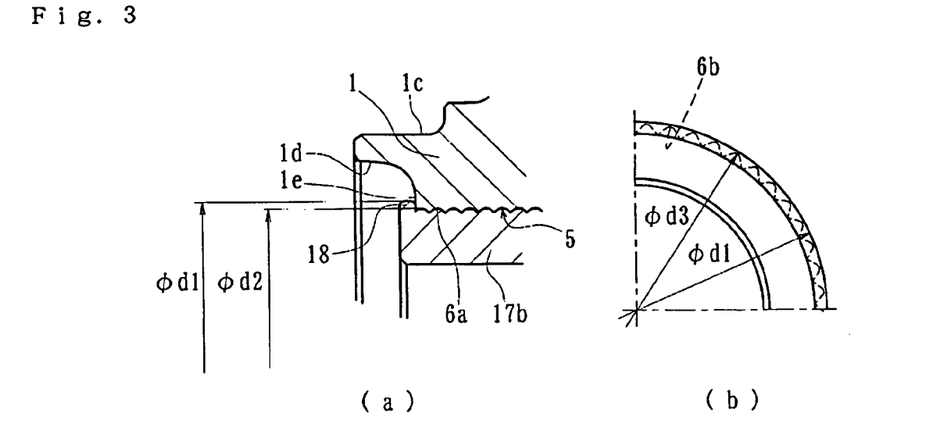
FIG. 3(a) is a partially enlarged section view of the first embodiment of the wheel bearing apparatus of the present invention.
FIG. 3(b) is a partially enlarged side elevation view of FIG. 3(a)

The region in which the irregular portion 5 is formed is set at an area from the wheel pilot portion 1c to a position near a line of action (i.e. an extension of a line connecting a contact point between the rolling element 9 and the inner raceway surface and the center of the rolling element 9). As shown in FIG. 3(a), a counterbore 1d is formed on the radial inner surface of the pilot portion 1c so that the fitting portion 17b projects from the outer end surface 1e of the wheel hub 1. This is intended to form a radially expanded end portion 18 after expanding of the fitting portion 17b. The outer diameter φd1 of the radially expanded end portion 18 is larger than the bottom diameter φd2 of the annular grooves 6a or the bottom diameter φd3 of the axial grooves 6b of the irregular portion 5. Thus, the radially expanded portion 18 can increase the axial pull-out proof force at the connected portion between the wheel hub 1 and the outer joint member 14. It is preferable to set the outer diameter φd1 at about 1.01~1.15 times the bottom diameters φd2 and φd3 of the annular grooves 6a and the axial grooves 6b, respectively.

Figure 4:
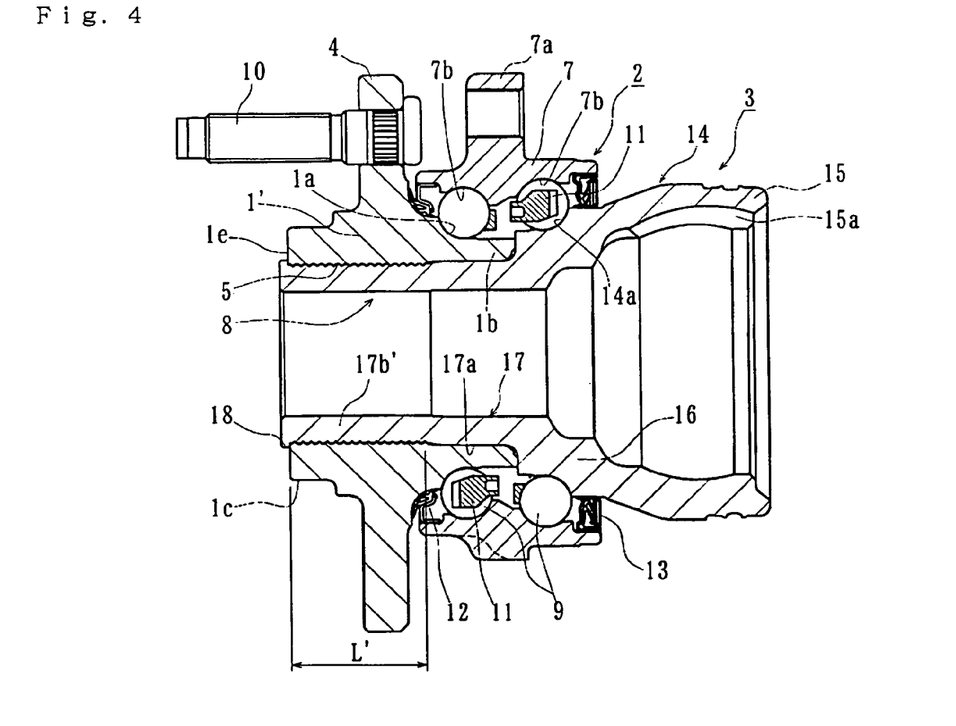
FIG. 4 is a longitudinal section view of a second embodiment of the wheel bearing apparatus of the present invention.

FIG. 4 is a longitudinal view of a second embodiment of the wheel bearing apparatus of the present invention. This embodiment differs from the first embodiment only in that the counterbore is not formed in the pilot portion of the wheel hub. Accordingly, the same reference numerals are used to designate the same parts.

In the bearing apparatus of this embodiment, a wheel hub 1', the double row rolling bearing 2 and the constant velocity universal joint 3 are assembled as a unit. The wheel pilot portion 1c of the wheel hub 1' is not formed with any counterbore. Thus, the radial inner surface of the pilot portion 1c is extended longer than in the first embodiment. Accordingly the length of the fitting portion 17b' of the shaft portion 17 of the outer joint member 14 is also extended. The outer end 18 of the fitting portion 17b' is positioned slightly beyond the outer end surface 1e of the wheel hub 1'. In this embodiment, the length L' of the caulking portion of the fitting portion 17b' is longer than the length L in the first embodiment (L'<L) and thus a higher pull-out proof force can be obtained as compared to the first embodiment.

Figure 5:
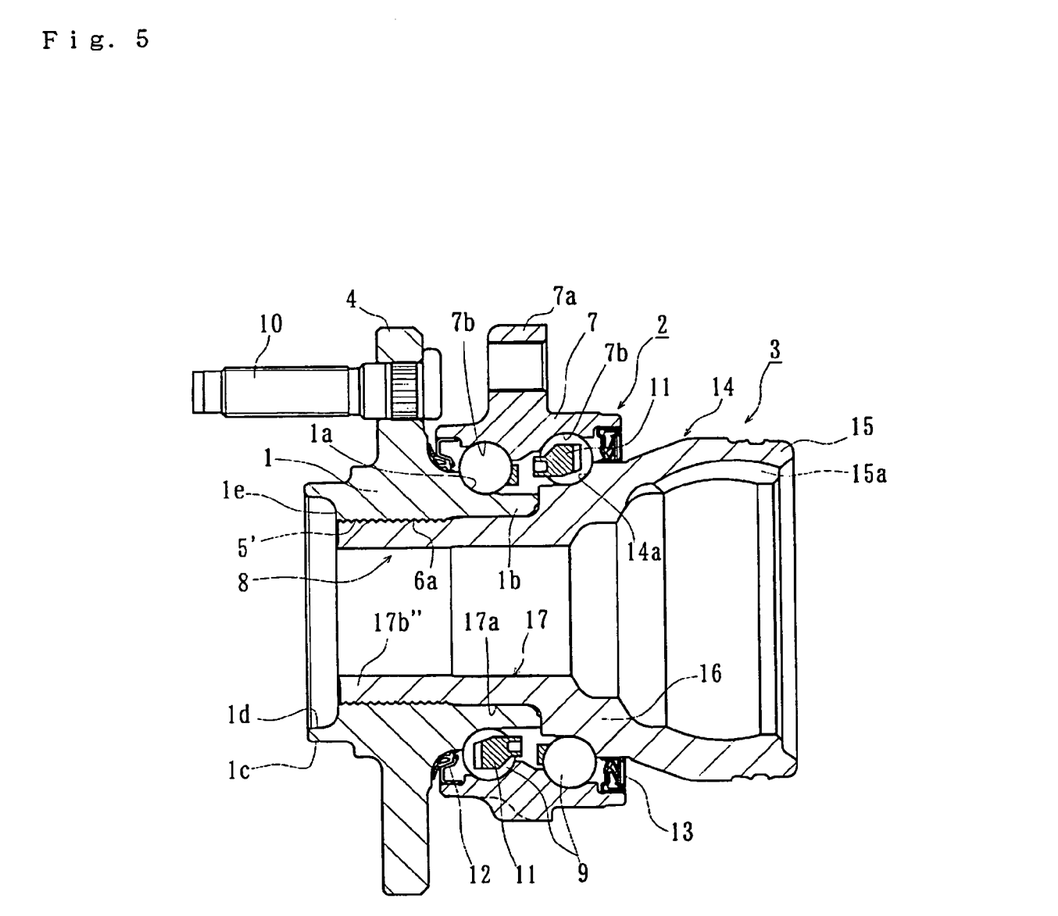
FIG. 5 is a longitudinal section view of a third embodiment of the wheel bearing apparatus of the present invention.

FIG. 5 is a longitudinal view of a third embodiment of the wheel bearing apparatus of the present invention. This embodiment differs from the aforementioned embodiments only in the structure of the connected portion between the wheel hub and the outer joint member. Thus, the same reference numerals are used to designate the same parts.

The radial inner surface of the wheel hub 1 is formed with the hardened irregular portion 5'. The wheel hub 1 and the outer joint member 14 are integrally connected via plastic deformation. The hardened irregular portion 5' of the wheel hub 1 bites into the fitting portion 17b'' of the shaft portion 17 of the outer joint member 14. The region in which the irregular portion 5' is formed is set at an area from the wheel pilot portion 1c to a position near a line of action of the rolling element 9. The counterbore 1d is formed on the end surface of the outboard side of the wheel hub 1.

The length of the fitting portion 17b'' is determined so that the end surface of the fitting portion 17b'' substantially corresponds to the outer end surface 1e of the wheel hub 1. The irregular portion 5' has substantially orthogonally crossed grooves 6 formed by a plurality of discontinuous lathe turned annular grooves 6a and a plurality of broached axial grooves (not shown). The depths of the annular grooves and the axial grooves are substantially same. The number and size are appropriately determined so as to enable the hardened projections (each having a pyramid configuration) of the irregular portion 5' to bite into the fitting portion 17b''. In addition, the radial inner diameter of the irregular portions 5' of the wheel hub 1, the radial inner diameter of the fitting portion 17b'' and the radial outer diameter of the expanding tool, such as a mandrel, are determined so that the irregular portion 5' can effectively bite into the material of the fitting portion 17''.

Figure 6:
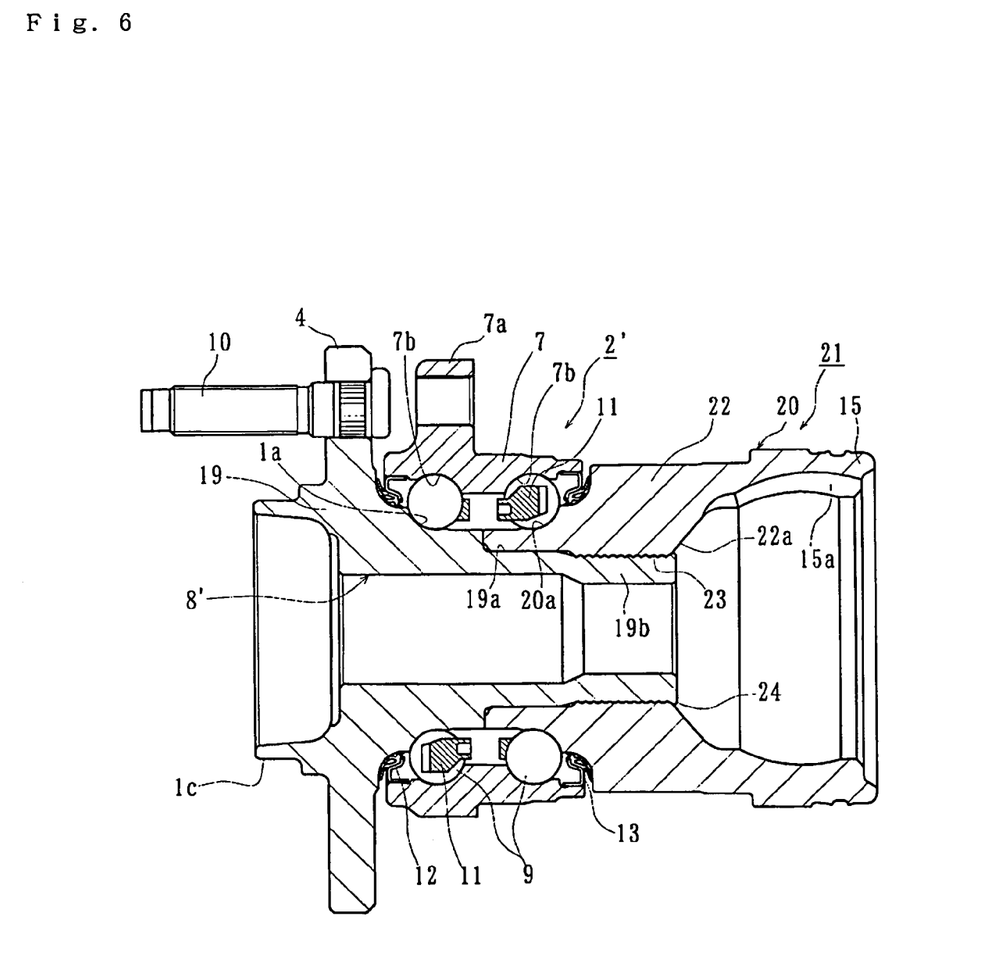
FIG. 6 is a longitudinal section view of a fourth embodiment of the wheel bearing apparatus of the present invention.

FIG. 6 is a longitudinal view of a fourth embodiment of the wheel bearing apparatus of the present invention. In the wheel bearing apparatus of this embodiment, a wheel hub 19, a double row rolling bearing 2' and a constant velocity universal joint 21 are assembled as a unit. Same reference numerals are used to designate the same parts.

The wheel hub 19 is formed integrally with a wheel mounting flange 4 to mount a wheel (not shown). Hub bolts 10, to secure the wheel, are equidistantly arranged along the periphery of the flange 4. The inner raceway surface 1a of the outboard side is formed on the outer circumferential surface of the wheel hub 1. A stepped portion of smaller diameter 19a and a fitting portion 19b are extended from the inner raceway surface 1a.

The double row rolling bearing 2' includes an outer member 7, an inner member 8' and double row rolling elements 9 and 9. The outer member 7 has an integrally formed flange 7a to be mounted on a body of a vehicle (not shown). Double row outer raceway surfaces 7b and 7b are formed on the inner surface. In this case, the inner member 8' includes the wheel hub 19 and an outer joint member 20. The inner raceway surface 1a of the outboard side and the inner raceway surface 20a of the inboard side, respectively, correspond to the outer raceway surfaces 7b and 7b. The inner raceway surfaces 1a and 20a are formed on the outer circumferential surfaces of the wheel hub 1 and the outer joint member 20, respectively. The double row rolling elements 9 and 9 are arranged between the outer raceway surfaces 7b and 7b and the inner raceway surfaces 1a and 20a. The rolling elements 9 and 9 are rotatably held by cages 11 and 11. Seals 12 and 13 are arranged at the ends of the double row rolling bearing 2' in order to prevent leakage of grease contained within the bearing and also to prevent ingress of rain water or dusts.

The wheel hub 19 is formed with a hardened layer at the seal land portion, where the seal lip of the seal 12 slides, the inner raceway surface 1a and the stepped portion of small diameter 19a. These areas are heat treated by high frequency induction heating. The fitting portion 19b, to be radially enlarged, remains as a non heat treated portion having a surface hardness less than HRC 24 after forging.

The outer joint member 20 of the constant velocity universal joint 21 is made from a medium carbon steel such as S53C and includes the cup-shaped mouth portion 15 and the shoulder 22 forming the bottom of the mouth portion 15. The inner raceway surface 20a of the inboard side is directly formed on the outer circumferential surface of the hollow shoulder portion 22. An irregular portion 23 is formed on the inner circumferential surface of the shoulder 22 and is heat treated to a hardness of HRC 54~64. It is preferable to use high frequency induction heating which can easily be carried out to set the depth of the hardened layer. It is also possible to have a hardened layer throughout the surface by carburized hardening case-hardened steel such as SCr420.

The shoulder 22 of the outer joint member 20 is fitted onto the fitting portion 19b of the wheel hub 19. The shoulder 22 is press fit onto the stepped portion of the smaller diameter 19a of the wheel hub 19 abutting against the wheel hub 19. The wheel hub 19 and the outer joint member 20 are integrally connected via plastic deformation of the fitting portion 19b. The hardened irregular portion 23 of the shoulder 22 bites into the outer circumferential surface of the fitting portion 19b. Similarly to the first and second embodiments, since the projected end 24 can be radially outwardly expanded without any constraint to its diameter exceeding the bottom diameter of the axial grooves or annular grooves forming the irregular portion 23, it is possible to increase the pull-out proof force at the connected portion between the wheel hub 19 and the outer joint member 20.

Figure 7:
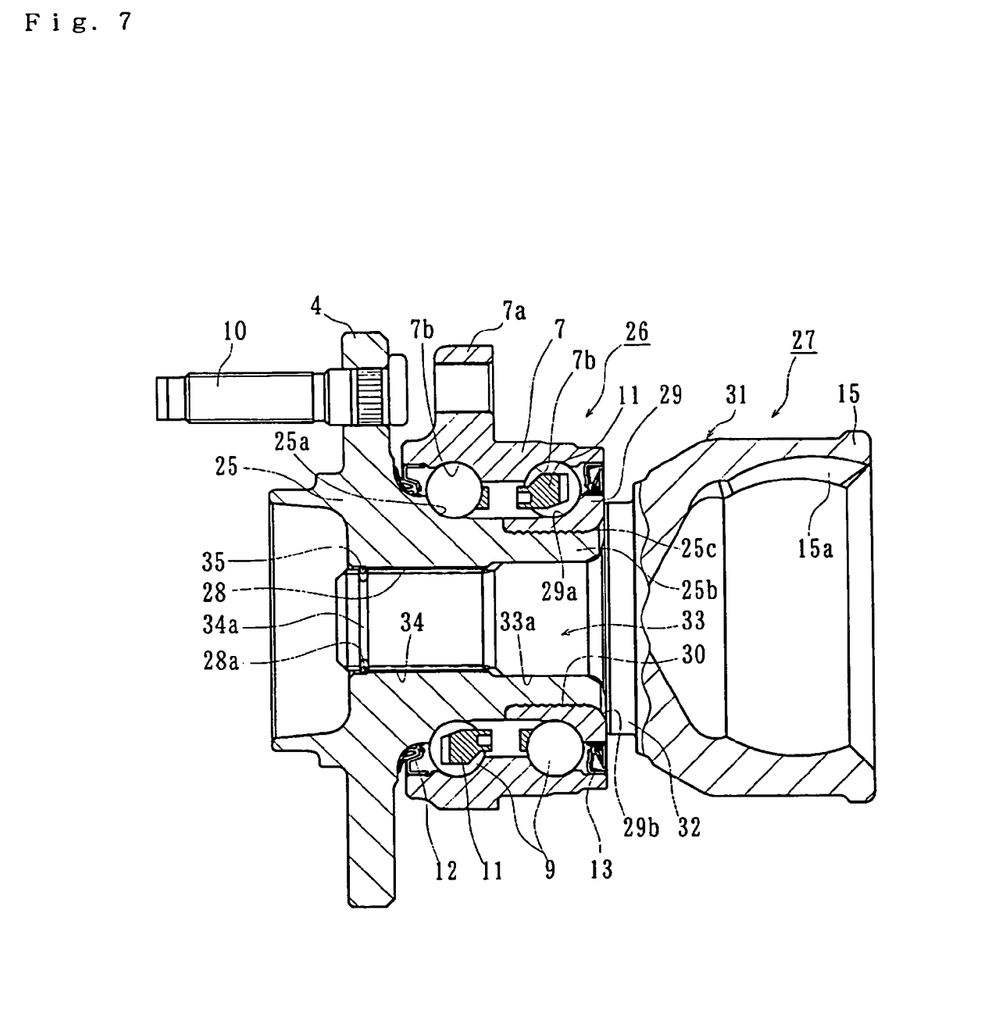
FIG. 7 is a longitudinal section view of a fifth embodiment of the wheel bearing apparatus of the present invention.

FIG. 7 is a longitudinal view of a fifth embodiment of the wheel bearing apparatus of the present invention. In the bearing apparatus of this embodiment, a wheel hub 25, a double row rolling bearing 26 and a constant velocity universal joint 27 are assembled as a unit. The same reference numerals are used to designate the same parts.

The wheel hub 25 is integrally formed with a wheel mounting flange 4 at the outboard side of the wheel hub 25 on which a wheel (not shown) is mounted. The inner raceway surface 25a of the outboard side is formed on the outer circumferential surface of the wheel hub 25. The spigot portion 25b extends from the inner raceway surface 25a. A separate inner ring 29 is press fit onto the spigot portion 25b to form a bearing apparatus of a so-called third generation. A serration (or spline) 28 is formed on the inner circumferential surface of the wheel hub 25 and an annular engaging groove 28a is formed at the end. The wheel hub 25 is formed with a hardened layer at the seal land portion, where the seal lip of the seal 12 slides, the inner raceway surface 25*a* and the spigot portion 25*b*, which are heat treated by high frequency induction heating. The fitting portion 19*b*, which is to be radially enlarged, remains as a non-heat treated portion having a surface hardness less than HRC 24 after forging.

The inner ring 29 is formed with an inner raceway surface 29*a* on the inboard side of its outer circumferential surface and the irregular portion 30 is formed on its inner circumferential surface. The inner ring 29 is made of high carbon chrome bearing steel and is hardened to its core by dip quenching to have a surface hardness of at least HRC 58~64. The wheel hub 25 and the inner ring 29 are integrally connected via plastic deformation. The spigot portion 25*b* is radially expanded to make the hardened irregular portion 30 bite into the spigot portion 25*b*. When the spigot portion 25*b* axially projects beyond the irregular portion 30, the radially expanded end 25*c* can engage a chamfered portion 29*b* of the inner ring 29. Thus, it is possible to increase the pull-out proof force at the connected portion between the wheel hub 25 and the inner ring 29.

The outer joint member 31 of the constant velocity universal joint 27 is made from medium carbon steel such as S53C and has the cup-shaped mouth portion 15, the shoulder 32 forming the bottom of the mouth portion 15, and a shaft portion 33 axially extending from the shoulder portion 32. The shaft portion 33 is formed with a stepped portion of smaller diameter 33*a* with a serration (or spline) 34 engaging the serration 28 of the wheel hub 25. A groove 34*a*, formed on the forward end of the serration 34, receives a clip 35 having a round cross section. The portion from the shoulder 32 to the stepped portion 33*a* is hardened to have a surface hardness of at least HRC 54~64.

The shaft portion 33 is fitted into the wheel hub 25 with the clip 35 mounted within the groove 34*a* of the serration 34 keeping its compressed condition until the end surface of the inner ring 29 abuts against the shoulder 32 of the outer joint member 31. When the clip 35 arrives at the groove 28*a*, formed on the serration 28 of the wheel hub 25, the clip 35 springs back into the groove 28*a*. The wheel hub 25 and the outer joint member 31 can be axially detachably connected to each other by engaging or disengaging the clip 35 with the grooves 28*a* and 34*a*. In this embodiment, since the wheel hub 25 and the inner ring 29 are connected via plastic deformation, it is possible to prevent the pull-out of the double row rolling bearing 26 even if a predetermined pulling-out force is applied.

Figure 8:
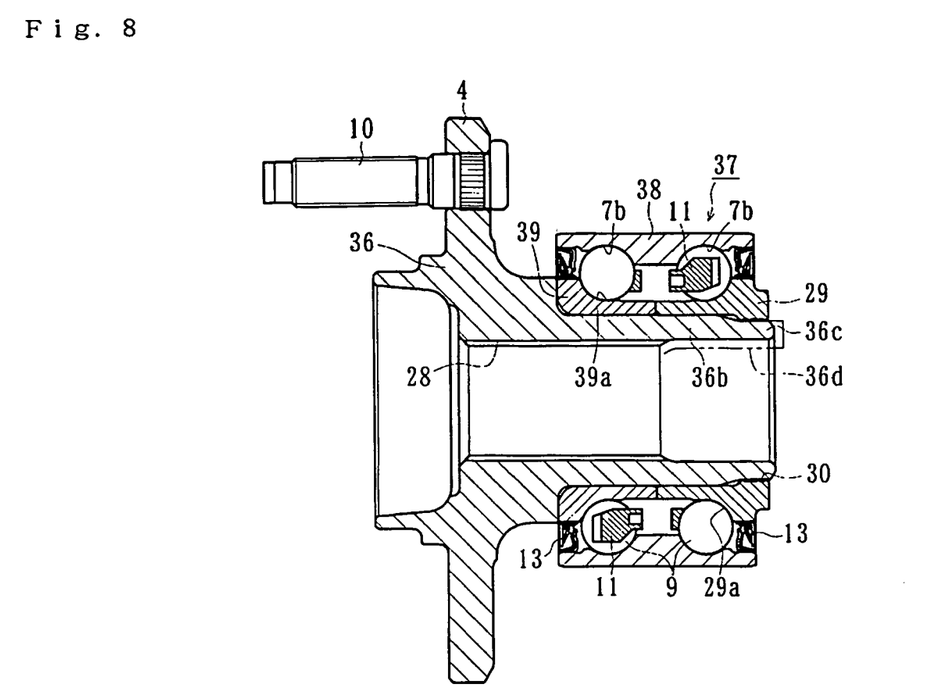
FIG. 8 is a longitudinal section view of a sixth embodiment of the wheel bearing apparatus of the present invention.

FIG. 8 is a longitudinal view of a sixth embodiment of the wheel bearing apparatus of the present invention. In the bearing apparatus of this embodiment, a wheel hub 36, a double row rolling bearing 37 and a constant velocity universal joint (not shown) are assembled as a unit. The same reference numerals are used to designate the same parts.

The wheel hub 36 is formed integrally with a wheel mounting flange 4 at the outboard side of the wheel hub 36 on which a wheel (not shown) is mounted. The spigot portion 36*b* extends from the wheel mounting flange 4. The double row rolling bearing 37 is press fit onto the spigot portion 36*b* providing a so-called first generation bearing apparatus. The serration (or spline) is formed on the inner circumferential surface of the wheel hub 36. The wheel hub 36 is made from medium carbon steel such as S53C. Its outer circumferential surface in the base of inboard side of the wheel mounting flange 4 and the spigot portion 36*b* are heat treated by high frequency induction heating. The fitting portion 36*c* at the end of the spigot portion 36*b*, which is to be radially enlarged, remains as a non-heat treated portion with a surface hardness less than HRC 24 after forging.

The double row rolling bearing 37 has an outer ring 38 with a double row outer raceway surface 7*b* formed on its inner circumferential surface and a pair of inner rings 39 and 29. The inner ring 39 includes an outboard side inner raceway surface 39*a* on its outer circumferential surface. The inner ring 29 has an inboard side inner raceway surface 29*a* on its outer circumferential surface. The inner ring 29 has an irregular portion 30 on its inner circumferential surface. The outer ring 38 and inner ring 39 and 29 are made of high carbon chrome bearing steel. They are hardened to their core by dip quenching to have the surface hardness of at least HRC 58~64. The wheel hub 36 and the inner ring 29 are integrally connected via plastic deformation. The fitting portion 36*c* of the spigot portion 36*b* of the wheel hub 36 is radially expanded to make the hardened irregular portion 30 bite into the fitting portion 36*c*.

The serration 28 of the wheel hub 36 and the region from the inner diameter to the end surface 36*d* (shown by a dotted line) are formed after the double row rolling bearing 37 has been integrally secured to the wheel hub 36. The inner ring 29 is axially detachably connected by using a nut or a clip to an outer joint member (not shown) with the end surface of the inner ring 29 abutting the shoulder of the outer joint member. In this embodiment, since the wheel hub 36 and the inner ring 29 are connected via the plastic deformation, it is possible to prevent the pull-out of the double row rolling bearing 37 even if a predetermined pulling-out force is applied.

Figure 9:
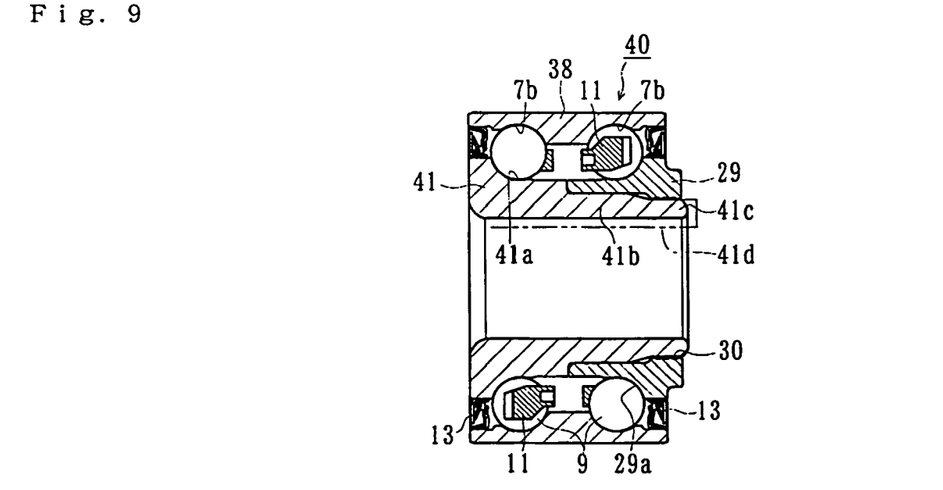
FIG. 9 is a longitudinal section view of a seventh embodiment of the wheel bearing apparatus of the present invention which is a modification of the sixth embodiment.

FIG. 9 is a longitudinal view of a seventh embodiment of the wheel bearing apparatus of the present invention which is a modification of the sixth embodiment (FIG. 8). In this embodiment, a double row rolling bearing 40, a wheel hub (not shown), and a constant velocity universal joint (not shown) are assembled as a unit. The same reference numerals are used to designate the same parts as those of the sixth embodiment.

The double row rolling bearing 40 has an outer ring 38 with double row outer raceway surface 7*b* formed on its inner circumferential surface and a pair of inner rings 41 and 29. The inner ring 41 has an outboard side inner raceway surface 41*a* formed on its circumferential surface. A spigot portion 41*b*, of smaller diameter, extends from the inner raceway surface 41*a*. The inner ring 29 is press fit onto the spigot portion 41*b* and thus the bearing apparatus is a so-called first generation. The wheel hub 41 is made from medium carbon steel such as S53C. The inner raceway surface 41*a* and the spigot portion 41*b* are heat treated by high frequency induction heating. The fitting portion 41*c* at the end of the spigot portion 41*b*, which is to be radially enlarged, remains as a non-heat treated portion with a surface hardness less than HRC 24 after forging.

The inner ring 41 and the inner ring 29 are integrally connected via plastic deformation by radially expanding the fitting portion 41*c* of the inner ring 41. This causes the hardened irregular portion 30 of the inner ring 29 to bite into the fitting portion 41*c*. The double row rolling bearing 40 is press fit onto the wheel hub (not shown) after being finished by grinding a region from the inner circumferential surface of the inner ring to an end surface 41*d* (dotted line). Similarly to the six embodiment, the inner ring 29 is axially detachably connected by using a nut or a clip to an outer joint member. The end surface of the inner ring 29 abuts the shoulder of the outer joint member.

Figure 10:
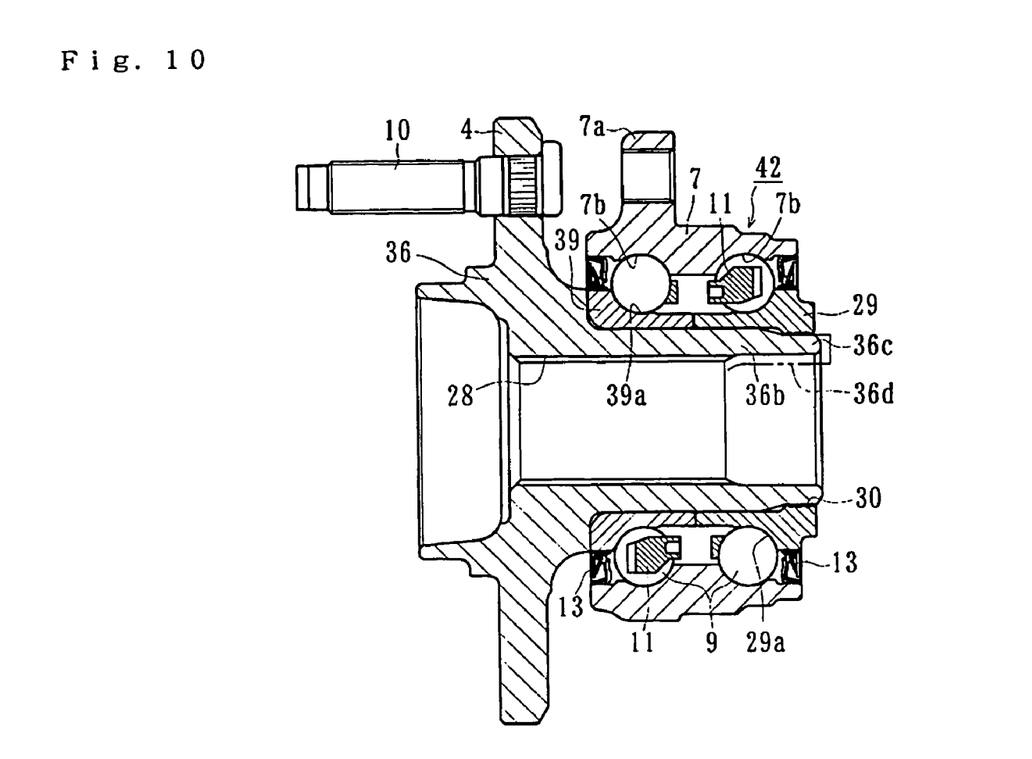
FIG. 10 is a longitudinal section view of an eighth embodiment of the wheel bearing apparatus of the present invention.

FIG. 10 is a longitudinal view of a eighth embodiment of the wheel bearing apparatus of the present invention. In this embodiment, a wheel hub 36, a double row rolling bearing 42 and a constant velocity universal joint (not shown) are assembled as a unit. This embodiment differs from the sixth embodiment (FIG. 8) only in the structure of the double row rolling bearing. Thus, the same reference numerals are used to designate the same parts as those of the sixth embodiment.

The double row rolling bearing 42 includes the outer member 7, formed integrally with a body mounting flange 7a, the double row outer raceway surface 7b on the inner circumferential surface, and a pair of inner rings 39 and 29. In this embodiment, the double row rolling bearing 42 is press fit onto the spigot portion 36b of the wheel hub 36. Thus, the bearing apparatus is a so-called second generation. The wheel hub 41 and the inner ring 29 are integrally connected via plastic deformation by radially expanding the fitting portion 36c of the spigot portion 36b. Accordingly, the hardened irregular portion 30 of the inner ring 29 bites into the fitting portion 36c.

Figure 11:
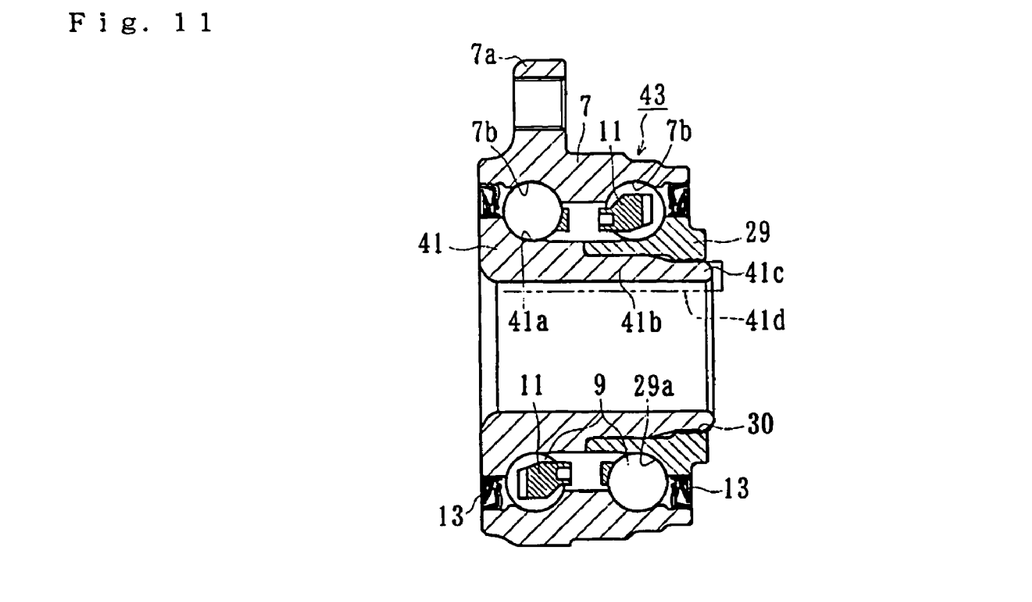
FIG. 11 is a longitudinal section view of a ninth embodiment of the wheel bearing apparatus of the present invention which is a modification of the eighth embodiment.

FIG. 11 is a longitudinal view of a ninth embodiment of the wheel bearing apparatus of the present invention which is a modification of the eighth embodiment (FIG. 10). In this embodiment, a double row rolling bearing 43, a wheel hub (not shown), and a constant velocity universal joint (not shown) are assembled as a unit. The same reference numerals are used to designate the same parts as those of the eighth embodiment.

The double row rolling bearing 43 includes the outer member 7, formed integrally with a body mounting flange 7a on the outer circumferential surface, the double row outer raceway surface 7b on the inner circumferential surface, and a pair of inner rings 41 and 29. The inner ring 41 has an outboard side inner raceway surface 41a. A spigot portion 41b, of smaller diameter, extends from the inner raceway surface 41a. The inner ring 29 is press fitted onto the spigot portion 41b. Thus, the bearing apparatus is a so-called first generation. The wheel hub 41 and the inner ring 29 are integrally connected via plastic deformation by radially expanding the fitting portion 41c of the inner ring 41. Accordingly, the hardened irregular portion 30 of the inner ring 29 bites into the fitting portion 41c. The double row rolling bearing 40 is press fit onto the wheel hub and similarly to the six embodiment, the wheel hub is axially detachably connected to the outer joint member by using a nut or a clip. Similarly to the eighth and ninth embodiments as well as the sixth and seventh embodiments, the region from the inner circumferential surfaces of the wheel hub 36 and the inner ring 41 to an end surfaces 36d and 41d (dotted line), including the serration 28, is finished by grinding after having radially enlarging the fitting portion.

It is shown, according to the pull-out test of the connected portion carried out by the applicant, that the connecting manner of plastic deformation of the fitting portion of the shaft portion by the irregular portion of the wheel hub (hereinafter referred to "enlarged caulking") exhibits higher pull-out proof force than the conventional connecting manner of forming the caulked portion by radially outward plastic deformation of the end portion of the shaft of the outer joint member (hereinafter referred to "swing caulking"). In addition, according to the endurance test simultaneously carried out, it is shown that the reduction of the axial force is caused by generation of the reduction of the predetermined pre-press amount of the double row rolling bearing when the connecting force is low, if the predetermined moment load is applied to the bearing apparatus. The reduction of the axial force would cause the breakage of the connected portion. Accordingly, it is important to study the relation between the pull-out proof force of the connected portion and the durability of the bearing apparatus.

Figure 12:
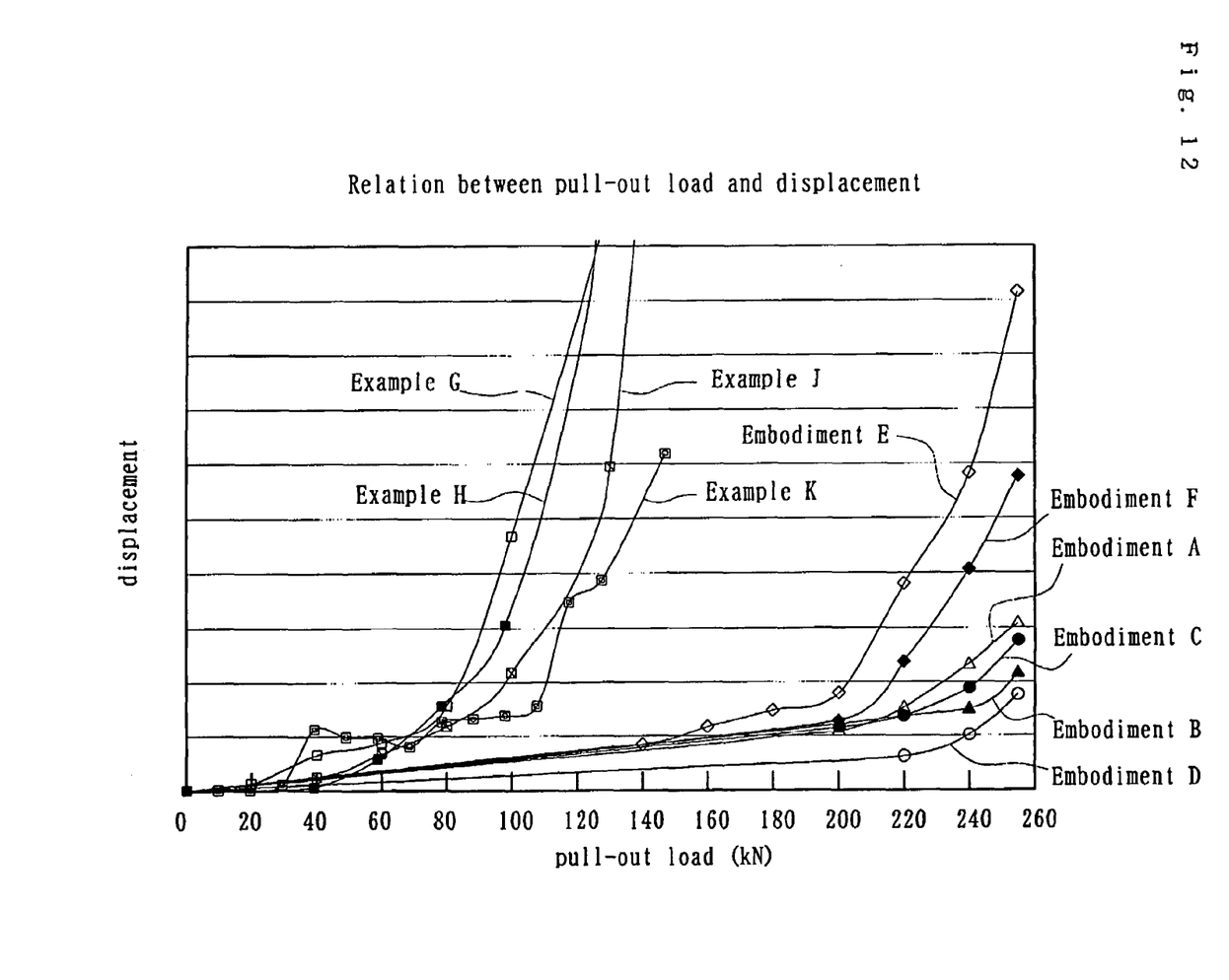
FIG. 12 is a graph showing results of a pull-out test at the connected portion of the wheel; hub and the outer joint member.

The applicant carried out the pull-out test of the connected portion based upon several samples made by the conventional swing caulking manner and the enlarged caulking manner. FIG. 12 shows the results of the pull-out test. It has been found that there is a point (i.e. starting point of slippage of the connected portion) at which the displacement in the connected portion is suddenly caused during gradually increasing the pull-out load to axially separate the connected portion between the wheel hub and the outer joint member. That is, the slippage starting point induces the pre-press pull-out and thus causes the reduction of the axial force. It is furthermore found that the pull-out proof force gives dominant influence to the durability of the bearing apparatus.

In FIG. 12, Embodiments B and C denote the first embodiment (FIG. 1). Embodiment A denotes the fourth embodiment (FIG. 6). Embodiment D denotes the second embodiment. Embodiment E denotes the fifth embodiment (FIG. 7). Embodiment F denotes the third embodiment (FIG. 5). Examples G, H, J and K denotes the results of tests on structures using conventional swing caulking.

As can be seen from these results, the enlarged caulking manner exhibits pull-out proof force more than 2 times those according to the conventional swing caulking manners. Also, a smaller displacement in the connected portion as well as higher rigidity as compared with the conventional structure occurs. In conventional swing caulking, although small displacement can be maintained below pull-out load of about 80 kN, slippage suddenly occurs beyond this point and thus the generation of the pre-press pull-out of the bearing portion is supposed. On the contrary, according to the enlarged caulking of the present invention, little displacement occurs in the connected portion below a pull-out load of about 200 kN and thus sufficient rigidity can be obtained. In addition, sufficient rigidity can be obtained and substantially no slippage occurs beyond 160 kN even though the connected portion is made in accordance with the conventional enlarged caulking manner, by optimally setting the specifications of the annular and axial grooves forming the irregular portion.

The present invention has been described with reference to the preferred embodiments. Obviously, modifications and alternations will occur to those of ordinary skill in the art upon reading and understanding the preceding detailed description. It is intended that the present invention be construed as including all such alternations and modifications insofar as they come within the scope of the appended claims or their equivalents.

What is claimed is:

1. A bearing apparatus for a driving wheel of a vehicle comprising:
   a wheel hub, a constant velocity universal joint and a double row rolling bearing assembled as a unit, said wheel hub and an outer joint member of the constant velocity universal joint are fitted with each other; and
   a connected portion of the wheel hub and the outer joint member has a plastic deformed connection mechanism which includes an irregular surface on said wheel hub and/or said outer joint member, deformation and said irregular surface connecting said wheel hub and outer joint member together such that the plastic deformed connection mechanism has an axial pull-out proof force more than 160 kN.

2. A bearing apparatus for a driving wheel of a vehicle according to claim 1 wherein one inner raceway surfaces surface, of the double row rolling bearing, being formed on the wheel hub and another of the double row inner raceway surfaces being formed on the outer joint member;

a hardened irregular portion being formed on a radial surface of the wheel hub where the wheel hub and the outer joint member are fitted with each other; and the wheel hub and the outer joint member are integrally connected via plastic deformation by radially outwardly expanding a radial surface of the outer member enabling the hardened irregular portion of the wheel hub to bite into the surface of the outer joint member.

3. A bearing apparatus for a driving wheel of a vehicle according to claim 2 wherein the outer joint member of the constant velocity universal joint is fitted into the wheel hub.

4. A bearing apparatus for a driving wheel of a vehicle according to claim 2 wherein the outer joint member of the constant velocity universal joint is fitted about an outer periphery of the wheel hub.

5. A bearing apparatus for a driving wheel of a vehicle according to claim 2 wherein the portion to be radially outwardly expanded projects beyond the hardened irregular portion.

6. A bearing apparatus for a driving wheel of a vehicle according to claim 5 wherein the hardened irregular portion is formed by substantially orthogonally crossed grooves comprising a plurality of axial grooves and annular grooves; and the outer diameter of the portion projecting beyond the hardened irregular portion is larger than the bottom diameter of the annular grooves or the axial grooves.

7. A bearing apparatus for a driving wheel of a vehicle according to claim 1 wherein the wheel hub and the outer joint member of the constant velocity universal joint are detachably connected with each other;

one inner raceway surface of the double row rolling bearing formed on an inner ring fitted onto the wheel hub and another double row inner raceway surface formed on the wheel hub; a hardened irregular portion formed on the inner ring; and the inner ring and the wheel hub being integrally connected via plastic deformation of the wheel hub by radially outwardly expanding the wheel hub enabling the hardened irregular portion of the inner ring to bite into the surface of the wheel hub.

8. A bearing apparatus for a driving wheel of a vehicle according to claim 1 wherein a load supporting capacity of the bearing of an inboard side of the double row rolling bearing is higher than that of the bearing of outboard side.

* * * * *

UNITED STATES PATENT AND TRADEMARK OFFICE
CERTIFICATE OF CORRECTION

| | | |
|---|---|---|
| PATENT NO. | : 7,220,183 B2 | Page 1 of 1 |
| APPLICATION NO. | : 10/658520 | |
| DATED | : May 22, 2007 | |
| INVENTOR(S) | : Fukushima et al. | |

It is certified that error appears in the above-identified patent and that said Letters Patent is hereby corrected as shown below:

<u>Column 2</u>
Line 34 after "member 71' ", insert --are--

Signed and Sealed this

Second Day of October, 2007

JON W. DUDAS
*Director of the United States Patent and Trademark Office*